United States Patent [19]

Sonobe

[11] Patent Number: 4,549,125
[45] Date of Patent: Oct. 22, 1985

[54] CIRCUIT FOR CONTROLLING THE ROTATION ANGLE OF A MOTOR

[75] Inventor: Yougi Sonobe, Tokyo, Japan

[73] Assignee: Anritsu Electric Company Limited, Tokyo, Japan

[21] Appl. No.: 614,973

[22] Filed: May 29, 1984

[30] Foreign Application Priority Data

May 31, 1983 [JP] Japan .................................. 58-94786

[51] Int. Cl.$^4$ .............................................. G05B 1/06
[52] U.S. Cl. .................................... 318/663; 318/632
[58] Field of Search ........................ 318/632, 663, 561

[56] References Cited

U.S. PATENT DOCUMENTS

| 3,617,849 | 11/1971 | Charlton | 318/663 X |
| 4,078,198 | 3/1978 | Murakosi et al. | 318/663 X |
| 4,096,562 | 6/1978 | Linz | 318/632 X |
| 4,122,379 | 10/1978 | Richter et al. | 318/632 X |
| 4,486,695 | 12/1984 | Blanc et al. | 318/663 X |

Primary Examiner—B. Dobeck
Attorney, Agent, or Firm—Frishauf, Holtz, Goodman & Woodward

[57] ABSTRACT

A circuit for controlling the rotation angle of a motor by comparing an output signal from angle setting means with the detection result from a potentiometer means which detects the rotation angle of the motor while the motor is driven in response to the output signal from the angle setting means which has: a first potentiometer for detecting the rotation angle of the motor; a second potentiometer for detecting another rotation angle at a phase different from that of the first potentiometer; an interval selecting means for selecting one of a plurality of interval signals in response to the output signal from the angle setting means; a potentiometer selecting means for selecting one of the output signals from the first and second potentiometers in response to the output signal from the interval selecting means; a compensating signal generating means for generating an offset compensating signal for compensating for an offset between a selected signal from the potentiometer selecting means and the output signal from the angle setting means; a compensating means for compensating for one of the output signal from the potentiometer selecting means and the output signal from the angle setting means in accordance with the offset compensating signal from the compensating signal generating means; and a comparing means for comparing one compensated signal and another noncompensated signal by the compensating means and for controlling the motor in accordance with a comparison result.

7 Claims, 7 Drawing Figures

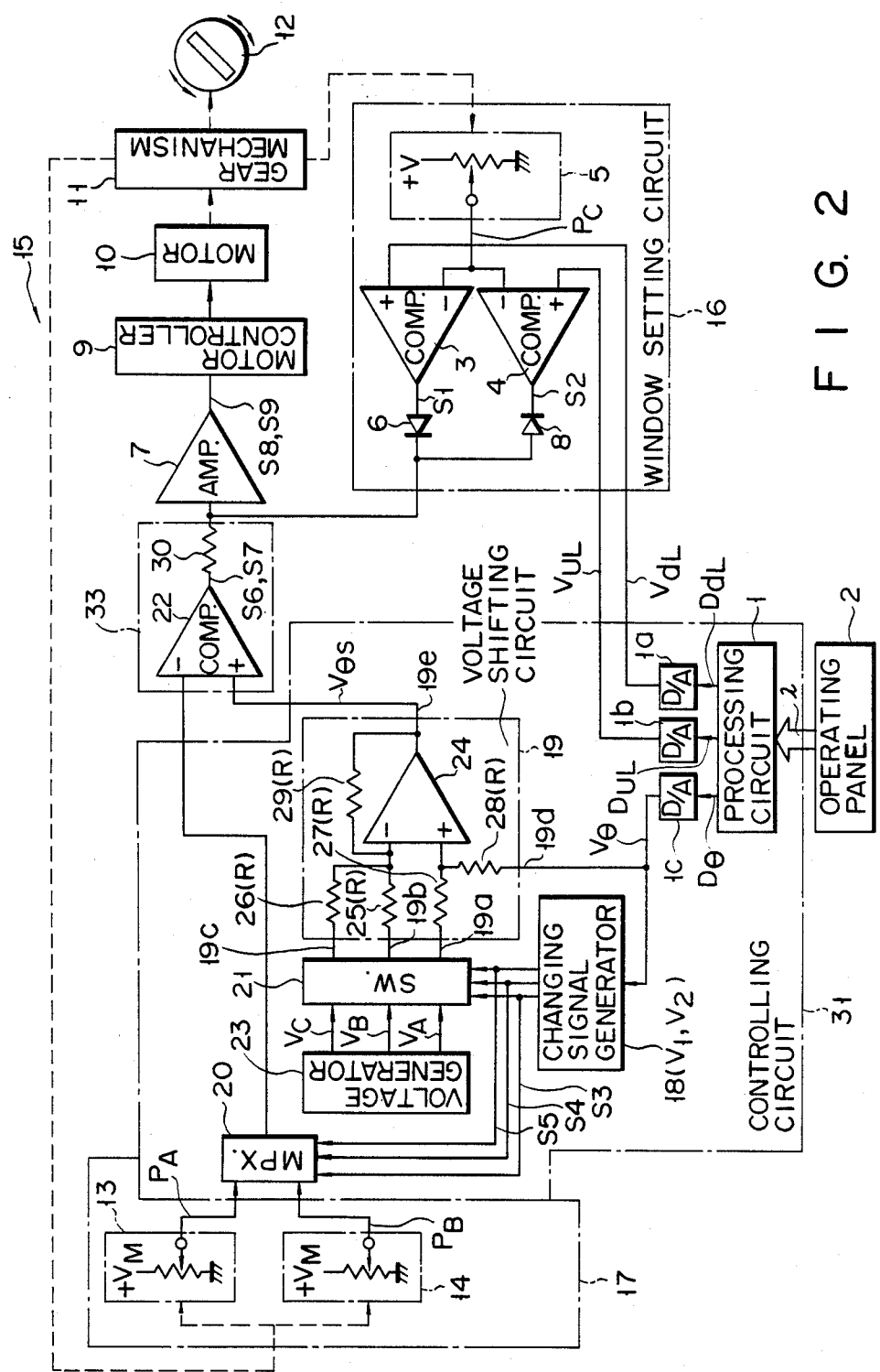
F I G. 2

CIRCUIT FOR CONTROLLING THE ROTATION ANGLE OF A MOTOR

BACKGROUND OF THE INVENTION

The present invention relates to a circuit for controlling the rotation angle of a motor for driving a grating (diffraction grating) of a monochromator and, more particularly, to a circuit for controlling the rotation angle of a motor wherein the rotation angle of the motor is precisely detected in a wide range by a plurality of potentiometers disposed such that their phases are shifted from each other, thereby eliminating control errors generated in the unstable regions of the potentiometers.

In optical equipment such as a monochromator, a grating is disposed such that an angle of the grating can change with respect to the optical axis of an optical system. Light transmitted through an optical fiber or the like is spectroscopically analyzed to obtain intensities of light components of the respective wavelengths of the incident light.

In a conventional circuit for controlling a rotation angle of a motor, a rotation angle of the grating is detected and controlled by a single potentiometer. When a slider of a potentiometer is moved in one of the unstable regions F at the vicinity pause the resistor in the potentiometer, the variations in output from the potentiometer become great and disable the proper control of the angle of the grating, therefore, the use of the grating is limited. When the rotation angle of the potentiometer is controlled in synchronism with optical equipment (or a drive device such as a motor for driving the optical equipment), the ability of the circuit for detecting a small change in output (voltage) is influenced by noise or the like, thus inevitably limiting the detection capability.

In order to prevent this influence, a reduction gear is disposed between the potentiometer and the motor or the like for driving the optical equipment to decrease the rotation speed of the motor. The reduced rotation speed is detected by the potentiometer, so that the variable angle range of the grating or the like driven by the motor can be widened even if only one potentiometer having the unstable regions F is used.

However, in this case, a change in output from the potentiometer becomes small with respect to a corresponding change in the rotation angle of the grating or the like. The output from the potentiometer can be easily influenced by noise or the like, thus disabling highly precise angle control. In addition, the relationship between noise and control precision can also be applied to a multi-rotation potentiometer. More specifically, an output from this potentiometer can change only within the range of voltages applied thereto. Even in the multi-rotation potentiometer, a change in its output voltage becomes small due to the multi-rotation of the potentiometer. This change in output voltage cannot be substantially detected. Therefore, the multi-rotation potentiometer cannot be used to precisely control the rotation angle of the grating or the like.

However, if a reduction gear is not used to decrease the rotation speed of the motor or the like for driving the grating or the like in optical equipment so as to increase the change in output from the potentiometer with respect to the rotation, or if a reduction gear having a small reduction gear ratio is used, the rotation angle of the grating (or motor) can only be controlled in the region excluding the unstable regions F of the potentiometer, thus limiting the controllable range.

SUMMARY OF THE INVENTION

The present invention has been made in consideration of the above situation, and has as its object to provide a circuit for controlling the rotation angle of a motor, wherein a rotation angle of a grating or the like can be accurately controlled even if a potentiometer having unstable regions in the vicinity pause of its resistor is used, and the range of rotation angle of the grating can be widened.

In order to achieve the above object of the present invention, there is provided a circuit for controlling the rotation angle of a motor by comparing an output signal from angle setting means with a detection result of potentiometer means for detecting the rotation angle of the motor while the motor is driven in response to the output signal from said angle setting means, comprising: a first potentiometer for detecting the rotation angle of the motor; a second potentiometer for detecting another rotation angle at a phase different from that of said first potentiometer; interval selecting means for selecting one of a plurality of interval signals in response to the output signal generated from said angle setting means; potentiometer selecting means for selecting one of the output signals from said first and second potentiometers in response to the output signal from said interval selecting means; compensating signal generating means for generating an offset compensating signal for compensating for an offset between a selected signal from said potentiometer selecting means and the output signal from said angle setting means; compensating means for compensating for one of the selected signal from said potentiometer selecting means and the output signal from said angle setting means in accordance with the offset compensating signal from said compensating signal generating means; and comparing means for comparing one compensated signal and another noncompensated signal by said compensating means and for controlling the motor in accordance with a comparison result.

According to the configuration described above, even if the potentiometer having unstable regions in the vicinity pause of its resistor is used, the rotation angle of the grating can be accurately measured and properly controlled. In addition, the rotation angle range of the grating can be widened.

BRIEF DESCRIPTION OF THE DRAWINGS

The present invention can be understood by reference to the accompanying drawings, in which:

FIG. 2 is a block diagram of a circuit for controlling the rotation angle of a motor according to a first embodiment of the present invention;

DETAILED DESCRIPTION OF THE PREFERRED EMBODIMENTS

Figure 1:
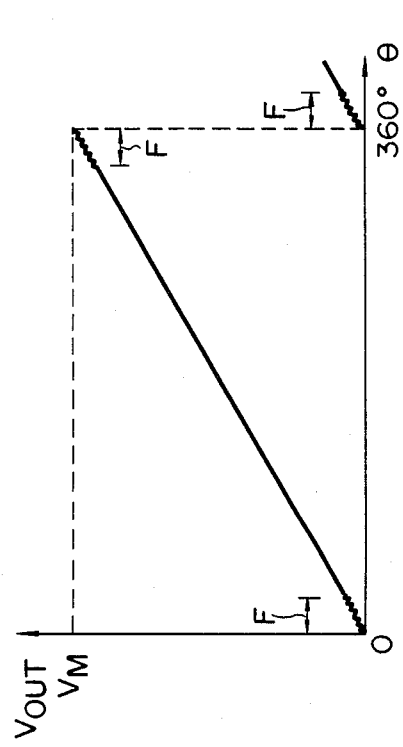
FIG. 1 is a graph for explaining the output characteristics of a conventional endless potentiometer.
Figure 3:
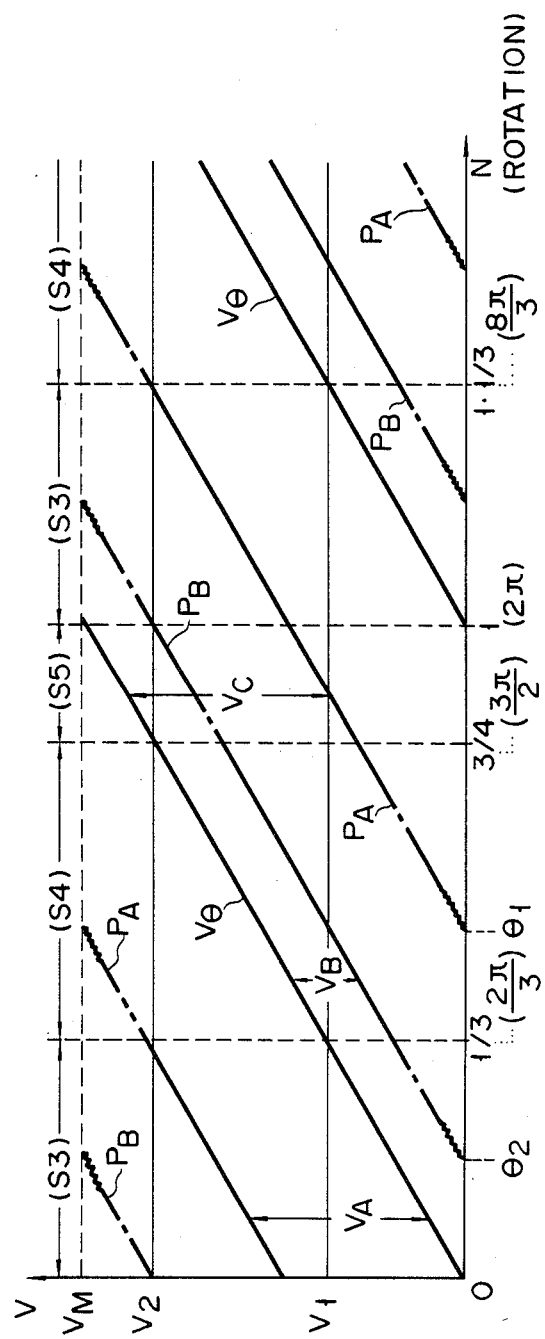
FIG. 3 is a chart for explaining the switching timings of first and second potentiometers 13 and 14 in the circuit shown in FIG. 2.

The present invention will be described in detail with reference to the accompanying drawings.

In order to best understand the present invention, the principle of rotation angle control for the motor will be briefly described.

In a circuit for controlling a rotation angle of a motor according to the present invention, two potentiometers having offset zero positions (pause positions of the resistors) are used to detect the rotation angle of the motor. Either output from these potentiometers is used to detect the rotation angle in accordance with the angular position of the motor. The unstable regions of the first potentiometer connected to the motor are offset from those of the second potentiometer. The outputs from the first and second potentiometers are alternately stabilized upon rotation of the motor. The stable output, i.e., the potentiometer subjected to rotation angle detection in the stable region, is used to control the rotation of the motor. Even if the motor is stopped at any angle, its position can be accurately determined.

The circuits for controlling the rotation angle of the motor which are based on the principle described above will be described in detail.

FIG. 2 is a block diagram showing a first embodiment of the rotational angle control circuit. In FIG. 2, reference numeral 1 denotes a processing circuit having a microprocessor, read only memory (ROM), random access memory (RAM), and the like. Lower limit data $D_{dL}$ and upper limit data $D_{UL}$ are obtained by the processing circuit 1 in order to set an approximate angle of a motor 10 with reference to wavelength data $\lambda$ supplied from an operating panel 2. Then, the lower and upper limit data $D_{dL}$ and $D_{UL}$ are respectively supplied to corresponding digital-to-analog converters (D/A converters) 1a and 1b, and are converted into lower and upper limit signals $V_{dL}$ and $V_{UL}$ ($V_{dL} < V_{UL}$) therein.

Thereafter, the lower and upper limit signals $V_{dL}$ and $V_{UL}$ are supplied to lower and upper limit comparators 3 and 4, respectively. The lower and upper limit comparators 3 and 4 compare the lower and upper limit signals $V_{dL}$ and $V_{UL}$ with an output, i.e., a rotation displacement detection signal $P_C$, from a third potentiometer 5. When a value of the rotation displacement detection signal $P_C$ is smaller than that of the lower limit signal $V_{dL}$, the lower limit comparator 3 supplies a forward rotation signal S1 to an amplifier 7 through a diode 6. When a value of the rotation displacement detection signal $P_C$ is larger than that of the upper limit signal $V_{UL}$, the upper limit comparator 4 supplies a reverse rotation signal S2 to the amplifier 7 through a diode 8. The amplifier 7 performs noninverting amplification of the signal supplied from the diode 6 or 8, and an output from the amplifier 7 is supplied to a motor controller 9. The motor controller 9 performs servo control of the motor 10 in accordance with the output of the amplifier 7. When a forward rotation signal S8 is supplied from the amplifier 7, the motor 10 is rotated in the forward direction. Alternatively, when a reverse rotation signal S9 is supplied, the motor 10 is rotated in the reverse direction. Then, a gear mechanism 11 drives a grating table 12, the third potentiometer 5 and first and second potentiometers 13 and 14 in accordance with an output from the motor 10. When the motor 10 is rotated N times, the grating table 12 is rotated N/F1 times (F1 indicates a first reduction gear ratio), the third potentiometer 5 is rotated N/F2 (F2 indicates a second reduction gear ratio) and the first and second potentiometers 13 and 14 are respectively rotated N times.

Accordingly, assume a case wherein the third potentiometer 5, for example, generates the rotation displacement detection signal $P_C$ which indicates that the motor 10 has been rotated twice from an initial position, and the processing circuit 1 generates the lower and upper limit data $D_{dL}$ and $D_{UL}$ which indicate $4\frac{3}{4}$-times rotation and $5\frac{1}{3}$-times rotation, respectively. Then, corresponding to the data $D_{dL}$ and the $D_{UL}$, the lower limit comparator 3 generates the forward rotation signal S1 until the value of the lower limit signal $V_{dL}$ coincides with the value of the rotation displacement detection signal $P_C$ from the third potentiometer 5, that is, until the motor is rotated $4\frac{3}{4}$ times in the forward direction. Alternatively, assume another case wherein the motor 10 has been rotated 7 times, and the processing circuit 1 also generates the lower and upper limit data $D_{dL}$ and $D_{UL}$, as in the above case. Then, the upper limit comparator 4 generates the reverse rotation signal S2 and the motor 10 is rotated $5\frac{1}{3}$ times in the reverse direction from the initial position.

As described above, in a rotation angle control circuit 15, a window setting circuit 16 is provided to control an approximate angle of the motor by the third potentiometer 5, and the lower and upper limit comparators 3 and 4 arranged therein.

Next, a circuit at the side of a precise position detector 17 will be described. The precise position detector 17 is provided to determine a precise angular position of the motor 10 having the approximate angular position determined by the window setting circuit 16. The processing circuit 1 obtains the lower and upper limit data $D_{dL}$ and $D_{UL}$ from the wavelength data $\lambda$ and then obtains rotation angle designation data $D_\theta$ in order to precisely control the motor 10.

The data $D_\theta$ is converted in a rotation angle designation signal $V_\theta$ by a D/A converter 1c and the signal $V_\theta$ is suppled to an input terminal of a changing signal generator 18 and a fourth input terminal 19d of a voltage shifting circuit 19. The changing signal generator 18 compares values of preset reference voltages $V_1$ and $V_2$ ($V_1 < V_2$) with a value of the rotation angle designation signal $V_\theta$. Then, the generator 18 generates a selection signal S3, if $V_\theta < V_1$; it generates a selection signal S4 is $V_1 \leq V_\theta < V_2$; and it generates a selection signal S5 if $V_2 \leq V_\theta$.

Output from the changing signal generator 18 is supplied to an analog switch 21 and a multiplexer (potentiometer selector) 20. The multiplexer 20 selects one of the first and second potentiometers 13 and 14 in the precise position detector 17 in accordance with the output from the changing signal generator 18. When one of the selection signals S3 and 18 is supplied to the multiplexer 20 from the generator 18, the multiplexer 20 selects the first potentiometer 13. When the selection signal S4 is supplied, it selects the second potentiometer 14.

The first and second potentiometers 13 and 14 are endless types and therefore the zero positions (or pause positions) thereof are respectively shifted by angles $\theta_1$ and $\theta_2$ with respect to those of the motor 10. When the first potentiometer 13 is selected by the multiplexer 20, an output (i.e., the first rotation angle detection signal $P_A$) from the potentiometer 13 is supplied to a comparator 22 in a comparison circuit 33 through the multiplexer 20. Alternatively, when the second potentiometer 14 is selected by the multiplexer 20, an output (i.e., the second rotation angle detection signal $P_B$) from the potentiometer 14 is supplied to the comparator 22 through the multiplexer 20.

On the other hand, the analog switch 21, the voltage shifting circuit 19 and a voltage generator 23 all shift the voltage of the rotation angle designation signal $V_\theta$ from D/A converter 1c, thereby respectively compensating for shifts between the first and second rotation angle detection signal $P_A$ and $P_B$, and the rotation angle designation signal $V_\theta$ caused by shifting the zero positions of the first and second potentiometers 13 and 14. In other words, the voltage generator 23 always generates compensation voltages $V_A$, $V_B$ and $V_C$ to be shift-widths of the rotation angle designation signal $V_\theta$ and supplies them to the analog switch 21.

The analog switch 21 selects an output from the voltage generator 23 in correspondence with an output from the changing signal generator 18 and supplies it to the voltage shifting circuit 19. When the selection signal S3 is supplied to the analog switch 21 from the changing signal generator 18, the compensation voltage $V_A$ is supplied to a first input terminal 19a of the voltage shifting circuit 19 through the switch 21. When the selection signal S4 is supplied, the compensation voltage $V_B$ is supplied to a second input terminal 19b. When the selection signal S5 is supplied, the compensation voltage $V_C$ is supplied to a third input terminal 19c.

The voltage shifting circuit 19 comprises a two-input type operational amplifier 24, input resistors 25 and 26 (resistances are respectively given as R) respectively inserted between an inverting input terminal of the operational amplifier 24 and the second and third input terminals 19b and 19c, input resistors 27 and 28 (resistances are respectively given as R) respectively inserted between a noninverting input terminal of the operational amplifier 24 and the first and fourth input terminals 19a and 19d, and a feedback resistor 29 (resistance is given as R) inserted between the inverting input terminal of the operational amplifier 24 and an output terminal thereof.

The voltage shifting circuit 19 shifts a voltage of the rotation angle designation signal $V_\theta$ from the D/A converter 1c. Therefore, when the processing circuit 1 generates the rotation angle designation data $D_\theta$ having a value smaller than that of the first reference voltage $V_1$, the voltage $V_A$ is added to the rotation angle designation signal $V_\theta$. When the circuit 1 generates data $D_\theta$ having a value larger than that of the first reference voltage $V_1$ but smaller than that of the second reference voltage $V_2$, the voltage $V_B$ is subtracted from the signal $V_\theta$. When the circuit 1 generates data $D_\theta$ having a value larger than that of the second reference voltage $V_2$, the voltage $V_C$ is subtracted from the signal $V_\theta$. Then, the output from the voltage shifting circuit 19 is supplied to the comparator 22.

The comparator 22 compares the output from the multiplexer 20 with a compensated rotation angle designation signal $V_{\theta S}$ supplied from the voltage shifting circuit 19. The comparator 22 then generates one of the forward and reverse rotation signals S6 and S7 and a stop signal (ground voltage) in correspondence with the above comparison results. The output from the comparator 22 is supplied to the amplifier 7 through a resistor 30. The resistor 30 together with the diodes 6 and 8 keeps the priority of the output of the comparator 22 to be lower than those of the lower and upper limit comparators 3 and 4. If either one of the lower and upper limit comparators 3 and 4 generates a signal, the signal from the comparator 3 or 4 is supplied to the amplifier 7 prior to the output of the comparator 22.

In the rotation angle control circuit 15 described above, a control circuit 31 comprises the processing circuit 1, the D/A converters 1a to 1c, the changing signal generator 18, the voltage generator 23, the analog switch 21, the voltage shifting circuit 19, and the multiplexer 20. The control circuit 31 controls the window setting circuit 16 to determine the approximate angular position of the motor 10 in accordance with the wavelength data λ supplied from the operating panel 2. Thereafter, the control circuit 31 controls the comparison circuit 33 to achieve precise control of the motor 10 in correspondence with the wavelength data λ and the output of the precise position detector 17.

An operation of the rotation angle control circuit 15 having a circuit configuration as described above will be described referring to FIGS. 4(a) to 4(o).

Figure 4:
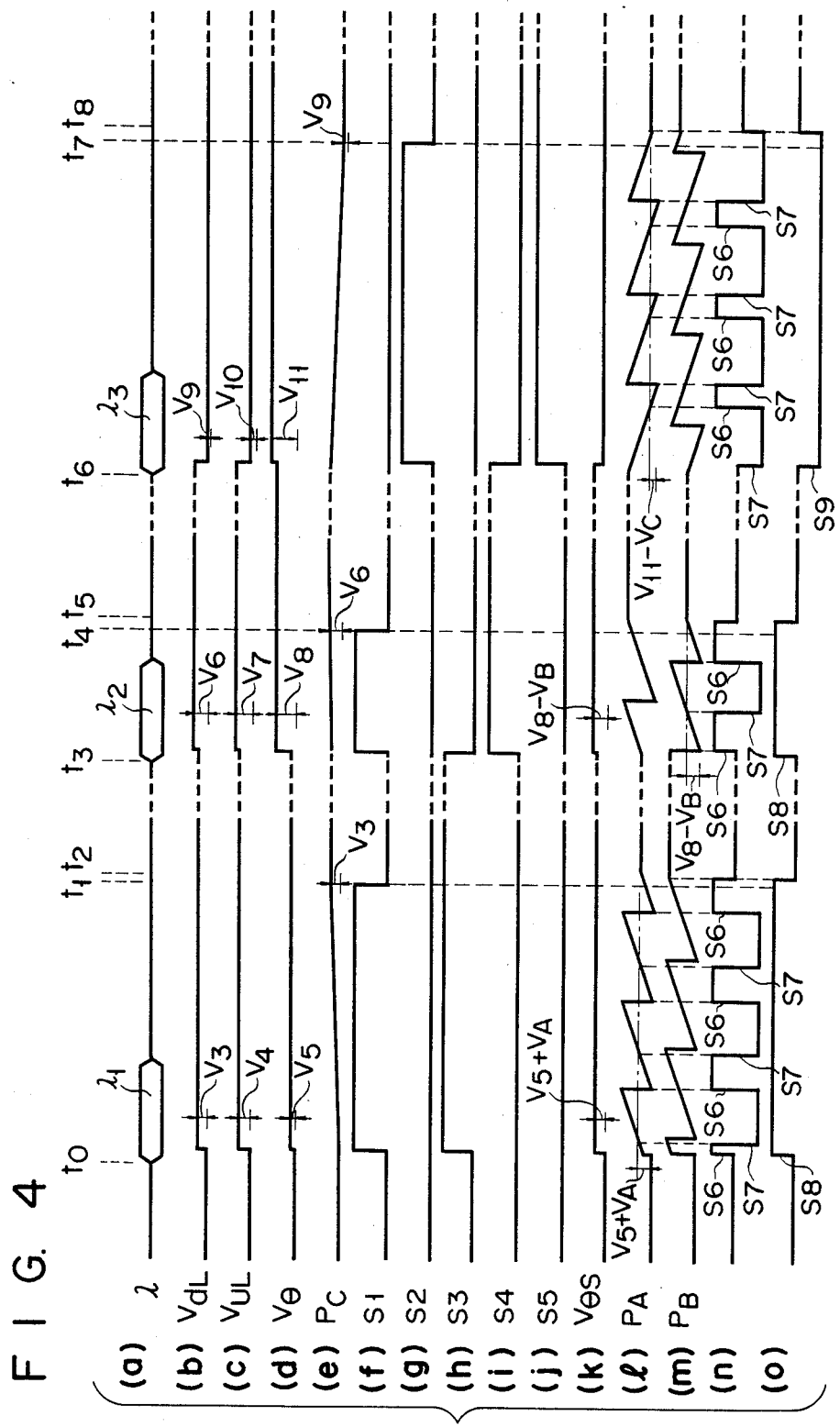
FIG. 4 is a timing chart for explaining the operation of the circuit shown in FIG. 2.

When an operator inputs wavelength data $\lambda_1$ shown in FIG. 4(a) at a time $t_O$ through the operating panel 2, the data $\lambda_1$ is processed by the processing circuit 1. If the wavelength data $\lambda_1$ indicates rotation of the motor 10 by $3\frac{1}{4}$ times, the processing circuit 1 generates the lower limit data $D_{dL}$ (the voltage thereof is $V_3$) for rotating the motor 10 by $2\frac{3}{4}$ times and the upper limit data $D_{UL}$ (the voltage thereof is $V_4$; where $V_4 > V_3$) for rotating the motor 10 by $3\frac{1}{4}$ times, as shown in FIGS. 4(b) and 4(c). Then, the window setting circuit 16 compares the lower and upper limit signals $V_{dL}$ and $V_{UL}$ generated from the control circuit 31 with the rotation displacement detection signal $P_C$ supplied from the third potentiometer 5. In this case, if the angular position of the motor 10 is the zero position, the window setting circuit 16 supplies the forward rotation signal S1 shown in FIG. 4(f) to the amplifier 7. In response to the signal S1, the amplifier 7 generates the forward rotation signal S8 shown in FIG. 4(o) from the output terminal thereof. Then, the signal S8 is supplied to the motor 10 through the motor controller 9 so as to initiate the forward rotation of the motor 10.

When the processing circuit 1 generates the upper and lower limit data $D_{UL}$ and $D_{dL}$, the processing circuit 1 also generates the rotation angle designation data $D_\theta$ (the voltage thereof is $V_5$; where $V_5 < V_1$) which indicates $\frac{1}{4}$-times rotation [i.e., $(3\frac{1}{4}-3)$-times rotation], as shown in FIG. 4(d). Then, the changing signal generator 18 generates the selection signal S3 to the multiplexer 20 and the analog switch 21 such that the multiplexer 20 selects the first potentiometer 13 and the switch 21 generates the compensation voltage $V_A$. Therefore, the rotation angle detection signal $P_A$ shown in FIG. 4(l) supplied from the potentiometer 13 is supplied to one input terminal of the comparator 22, and the compensated rotation angle designation signal $V_{\theta S}$ (the voltage thereof is $V_5 + V_A$) shown in FIG. 4(k) is supplied to the other input terminal of thereof. The comparator 22 compares these input signals to alternatively and repeatedly generate the forward and reverse rotation signals S6 and S7 shown in FIG. 4(n). However, as the forward rotation signal S1 is also generated by the window setting circuit 16, these outputs from the comparator 22 are neglected and the forward rotation of the motor 10 is continued. When the value of the output, i.e, the rotation displacement detection signal $P_C$ shown in FIG. 4(e), of the third potentiometer 5 coincides with that of the lower limit data $D_{dL}$ generated from the processing circuit 1 (at time $t_1$), the lower limit comparator 3 in the window setting circuit 16 detects this coincidence to stop generating the foward rotation signal S1. However, as the comparator 22 still generates the forward rotation signal S6, the amplifier 7 keeps generating the forward rotation signal S8 in response thereto. Then, when the motor 10 has been rotated by $3\frac{1}{4}$ times from the zero position and the value of the first rotation angle detection signal $P_A$ generated by the first potentiometer 13 coincides with that of the compensated rotation angle designation signal $V_{\theta S}$ generated from the voltage shifting circuit 19 (at time $t_2$), the comparator stops generating the forward rotation signal S6, and the motor 10 is stopped.

In this manner, when the operator inputs the wavelength data $\lambda_1$ for rotating the motor 10 by $3\frac{1}{4}$ times through the operating panel 2, the window setting circuit 16 causes the motor 10 to rotate $2\frac{3}{4}$ times. Then the circuit at the side of the precise position detector 17 causes the motor 10 to further rotate by $\frac{1}{2}$ times, i.e., $(3-2\frac{3}{4})+\frac{1}{4}$ times.

In this state, at time $t_3$ when the operator inputs wavelength data $\lambda_2$ which rotates the motor 10 by $4\frac{2}{3}$ times from the initial angle, i.e., the angle at time $t_0$, the processing circuit 1 generates the lower limit data $D_{dL}$ representing the voltage $V_6$ corresponding to the $4\frac{1}{3}$-times rotation, the upper limit data $D_{UL}$ representing the voltage $V_7$ corresponding to the $4\frac{3}{4}$-times rotation, and the rotation angle designation data $D_\theta$ representing the voltage $V_8$ (where $V_1 < V_8 < V_2$) corresponding to the $\frac{2}{3}$-times rotation in response to the data $\lambda_2$, as shown in FIG. 4(b) to 4(d). Then, the window setting circuit 16 causes the motor 10 to initiate the forward rotation in accordance with the data $D_{dL}$ and $D_{UL}$, while the changing signal generator 18 simultaneously generates the selection signal S4 shown in FIG. 4(i) in accordance with the data $D_\theta$. Thus, the output from the second potentiometer 14, i.e, the second rotation angle detection signal $P_B$ of FIG. 4(m), is supplied to the comparator 22, and the compensation voltage $V_B$ generated by the voltage generator 23 is supplied to the voltage shifting circuit 19. Then, the rotation angle designation signal $V_\theta$ obtained by D/A-converting the rotation angle designation data $D_\theta$ is decreased by the voltage $V_B$ by the circuit 19. The resultant signal is supplied to the comparator 22. In the comparator 22, the second rotation angle detection signal $P_B$ from the second potentiometer 14 and the compensated rotation angle designation signal $V_{\theta S}$ from the voltage shifting circuit 19 are compared. As a result, the comparator 22 alternatively and repeatedly generates the forward and reverse rotation signal S6 and S7 shown in FIG. 4(n). However, this output from the comparator 22 is neglected as in the case described above until the window setting circuit 16 stops generating the forward rotation signal S1, that is, until the motor 10 is rotated by 1 1/12 times ($4\frac{1}{3}-3\frac{1}{4}$ times) from the angle at time $t_3$, i.e., until time $t_4$. Therefore, the output from the comparator 22 causes the motor 10 to rotate further in the forward direction. Accordingly the motor 10 is rotated by $\frac{1}{3}$ times, i.e., $\frac{2}{3}-(3\frac{3}{4}-4)$ times, after the time $t_4$ in accordance with the forward rotation signal S6 from the comparator 22. When the value of the second rotation angle detection signal $P_B$ generated from the second potentiometer 14 coincides with that of the compensated rotation angle designation signal $V_{\theta S}$ (at time $t_5$), the motor 10 is stopped the angular position rotated by $4\frac{2}{3}$ times from the initial angle.

In the above state, when the operator inputs wavelength data $\lambda_3$ for rotating the motor 10 by 4/5 times from the initial angle through the operating panel 2 at time $t_6$, the processing circuit 1 generates the lower limit data $D_{dL}$ representing the voltage $V_9$ corresponding to the $\frac{3}{4}$-times rotation, the upper limit data $D_{UL}$ representing the voltage $V_{10}$ corresponding to the $1\frac{1}{3}$-times rotation and the rotation angle designation data $D_\theta$ representing the voltage $V_{11}$ ($V_2 < V_{11}$) corresponding to the 4/5-times rotation. The window setting circuit 16 generates the reverse rotation signal S2 shown in FIG. 4(g) in accordance with the data $D_{dL}$ and $D_{UL}$ until the angle of the motor 10 returns to the angle rotated by $1\frac{1}{3}$ times from the initial angle. On the other hand, the changing signal generator 18 generates the selection signal S5 shown in FIG. 4(j) in accordance with the data $D_\theta$. The multiplexer 20 then selects the output from the first potentiometer 13 and the analog switch 21 selects the compensation voltage $V_C$ to shift the rotation angle designation signal $V_\theta$ by the voltage $V_C$. Therefore, when the window setting circuit 16 stops generating the reverse rotation signal S2 at time $t_7$, the reverse rotation signals 7 from the comparator 22 is rendered effective. Then, the motor 10 is further rotated by 8/15 times, i.e., $1\frac{1}{3}-4/5$ times, after the time $t_7$ and is then stopped.

In this manner, in the rotation angle control circuit 15, stop angular position data of the motor 10 can be obtained for the wavelength data $\lambda$ input through the operating panel 2. If the stop angular position data indicates the angle in the output stable regions of the first potentiometer 13, the final stop angular position of the motor 10 can be controlled in accordance with the output from the first potentiometer 13. If the stop angular position data also indicates the angle in the output stable regions of the second potentiometer 14, the final stop angular position of the motor 10 can be controlled in accordance with the output from the second potentiometer 14. Therefore, even if the motor 10 is stopped at any angle, the motor 10 can be precisely controlled and can be rotated in a wide range without being affected by the ranges of the unstable regions of the potentiometers. In the first embodiment described above, the output from the D/A converter 1c is voltage-shifted. However, the output from the multiplexer 20 can alternatively be voltage-shifted, if the voltage shifting circuit 19 is inserted between the multiplexer 20 and the comparator 33.

Figure 5:
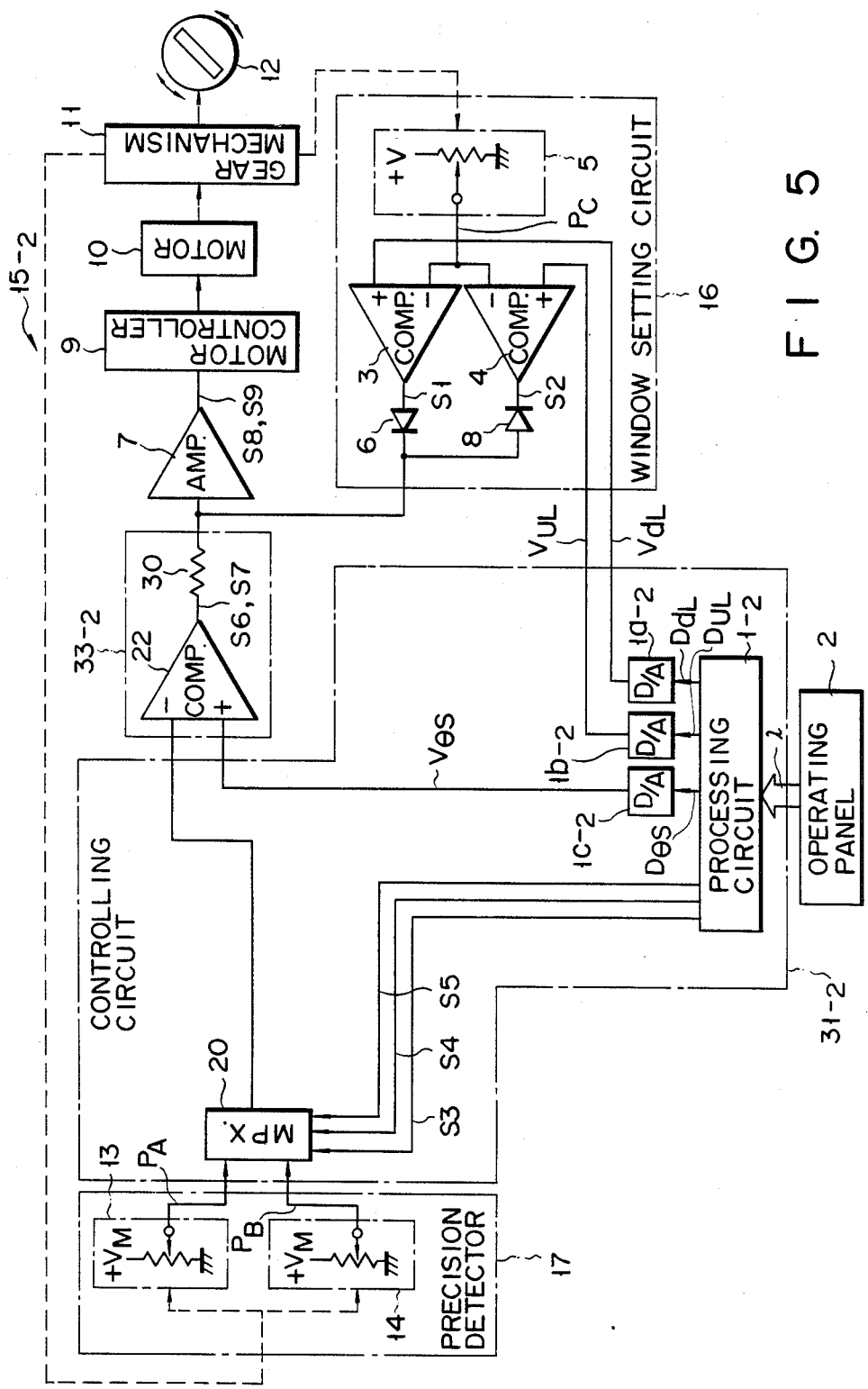
FIG. 5 is a block diagram of a circuit for controlling the rotation angle of a motor according to a second embodiment of the present invention.

FIG. 5 is a block diagram of a circuit for controlling the rotation angle of a motor according to a second embodiment of the present invention. The same reference numerals used in FIG. 5 denote the same parts as in FIG. 2. Referring to FIG. 5, reference symbol 1-2 denotes a processing circuit which includes a microprocessor, a RAM, a ROM and various interfaces. Lower limit data $D_{dL}$ and upper limit data $D_{UL}$ are obtained from wavelength data $\lambda$ entered at an operating panel 2. In addition, the processing circuit 1-2 calculates compensated angle designation data $D_{\theta S}$ in accordance with the flow chart of FIG. 6. The data $D_{\theta S}$ is converted by a D/A converter 1C-2 to an analog signal. At the same time, the processing circuit 1-2 directly controls a multiplexer 20.

Figure 6:
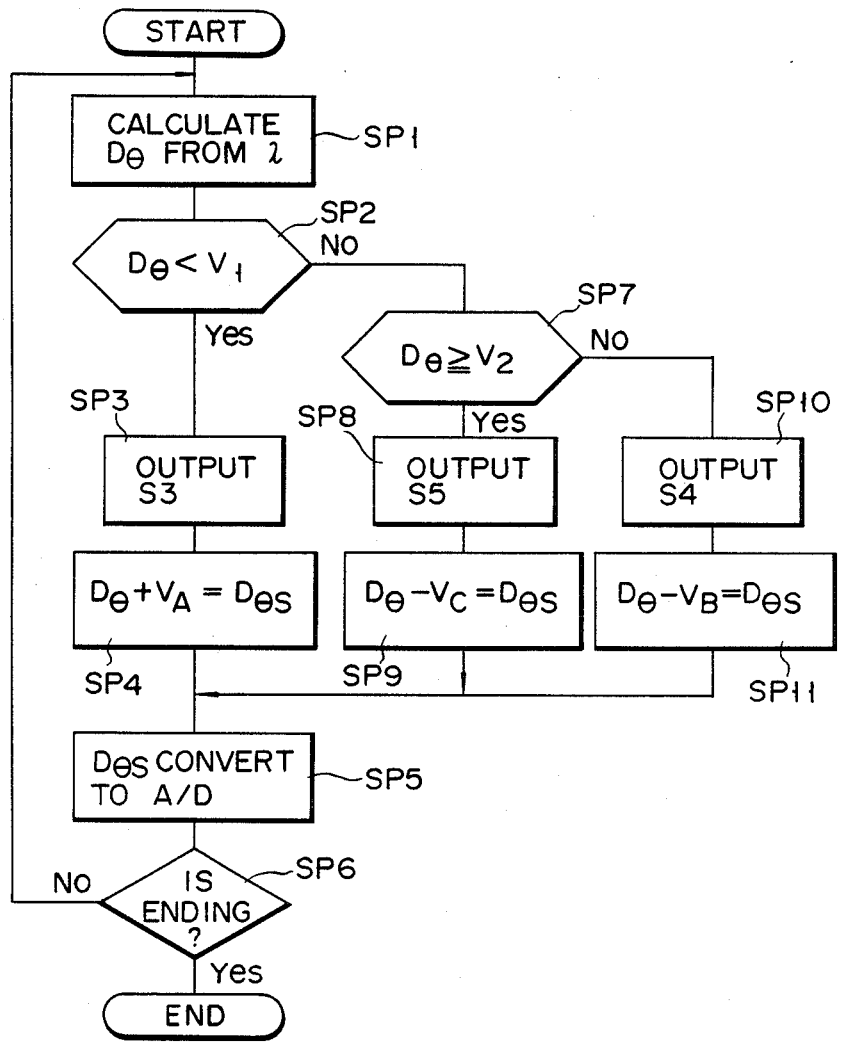
FIG. 6 is a flow chart for explaining the operation of the circuit shown in FIG. 5.

The processing circuit 1C-2 will be described in detail with reference to FIG. 6. The processing circuit 1-2 calculates and generates the upper and lower limit data $D_{dL}$ and $D_{UL}$. Thereafter, in step SP1, the processing circuit 1-2 calculates the angle designation data $D_\theta$ from the wavelength data λ. In step SP2, the processing circuit 1-2 compares the angle designation data $D_\theta$ with first reference voltage data $V_1$ and checks whether or not $D_\theta < V_1$. If Yes in step SP2, the flow advances to step SP3 wherein the processing circuit 1-2 supplies a selection signal S3 to the multiplexer 20 which thus selects a first potentiometer 13. In step SP4, the angle designation data $D_\theta$ is added to the preset compensating voltage data $V_A$ to produce the compensated angle designation data $D_{\theta S}$. In step SP5, the compensated angle designation data $D_{\theta S}$ is supplied to the D/A converter 1C-2 and is converted to analog data.

In this case, a first angle detection signal $P_A$ selected by the multiplexer 20 is supplied to one input terminal of a comparator 22, and the other input terminal thereof receives the compensated angle designation signal $V_{\theta S}$ obtained from the compensated angle designation data $D_{\theta S}$ directly generated from the processing circuit 1. The comparator 22 compares the first angle detection signal $P_A$ with the compensated angle designation signal $V_{\theta S}$. When the above sequence is completed, the flow returns to the initial step through step SP6.

When the angle designation data $D_\theta$ obtained in step SP1 is determined to be larger than the first reference voltage data $V_1$ (i.e., $D_\theta \geq V_1$) in step SP2, the flow advances to step SP7. The processing circuit 1-2 checks in step SP7 whether or not $D_\theta \geq V_2$ is established. If Yes in step SP7, the processing circuit 1-2 performs steps SP8 and SP9 to generate a selection signal S5. In response to the signal S5, the compensated voltage data $V_C$ is subtracted from the angle designation data $D_\theta$ to provide the compensated angle designation data $D_{\theta S}$. Thereafter, the processing circuit 1-2 performs steps SP5 and SP6, so that the compensated angle designation signal $V_{\theta S}$ is supplied to the comparator 22. However, if $D_\theta < V_2$, i.e., if No in step SP7, steps SP10 and SP11, and steps SP5 and SP6 are sequentially executed to supply a second angle detection signal $P_B$ to one input terminal of the comparator 22. The other input terminal of the comparator 22 receives the analog data $(V_{\theta S})$ of the compensated designation data $D_{\theta S}$ obtained by subtracting the compensating voltage data $V_B$ from the angle designation data $D_\theta$.

In this manner, in a circuit 15-2 for controlling the rotation angle of the motor, the compensated angle designation data $D_{\theta S}$ is calculated in a software manner under the control of the processing circuit 1-2. In addition, one of the selection signals S3 to S5 from the processing circuit 1-2 is directly supplied to the multiplexer 20. The same effect as in the first embodiment can be obtained without using the changing signal generator 18, the voltage shifting circuit 19, the analog switch 21 and the voltage generator 23. In this case, a voltage generator 18 may be arranged such that an output thereof is A/D converted and a digital signal obtained is then supplied to the processing circuit, thereby obtaining the same effect as in the above embodiment.

Figure 7:
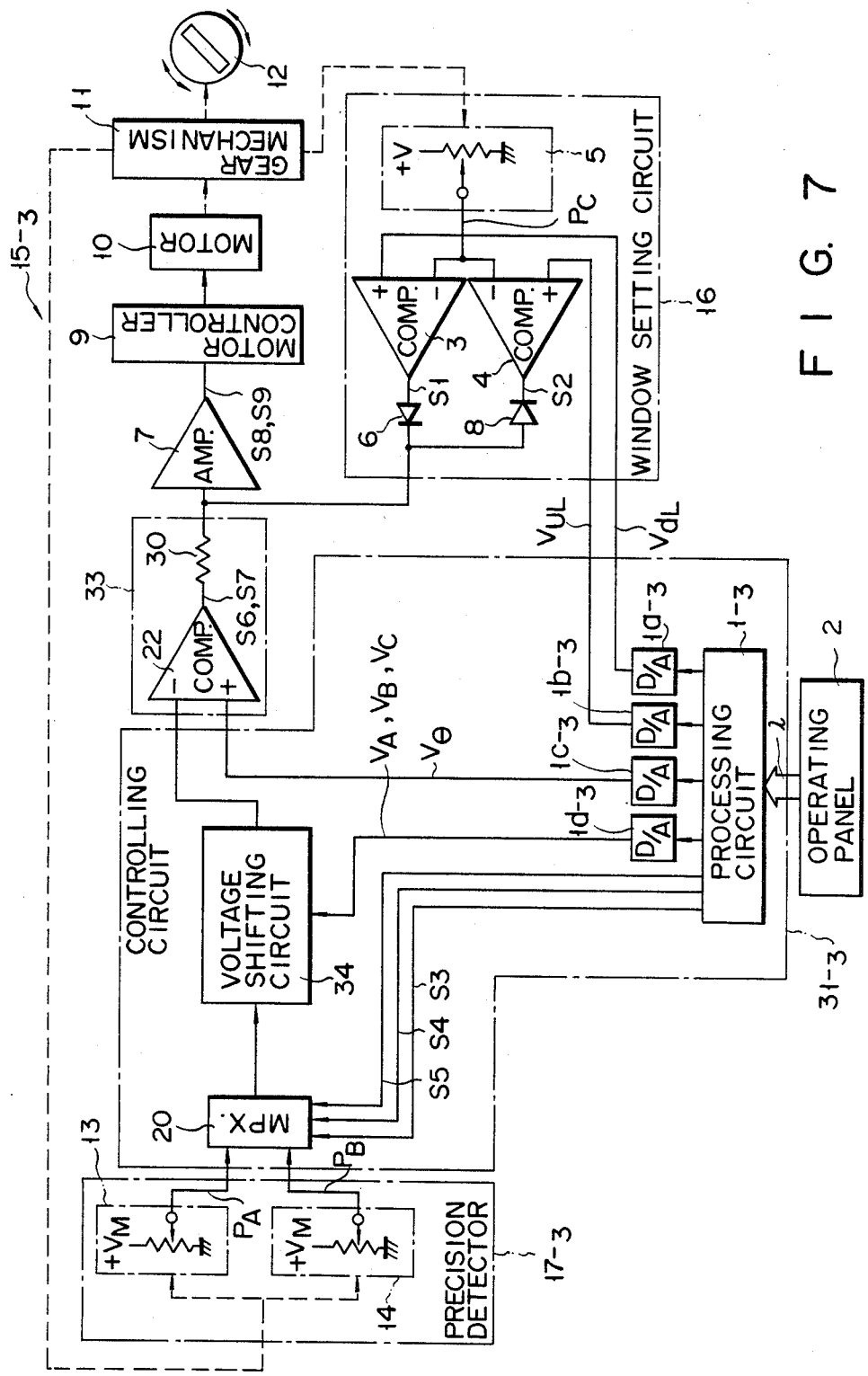
FIG. 7 is a block diagram of a circuit for controlling the rotation angle of a motor according to a third embodiment of the present invention.

FIG. 7 is a block diagram of a circuit for controlling the rotation angle of a motor according to a third embodiment of the present invention. The same reference numerals as in FIG. 7 denote the same parts as in FIG. 2. A processing circuit 1-3 in FIG. 7 calculates lower limit data $D_{dL}$, upper limit data $D_{UL}$ and angle designation data $D_\theta$ in accordance with wavelength data λ entered at an operating panel 2. The resultant data are D/A converted by D/A converters 1a-3 to 1c-3, respectively.

Analog values of lower and upper limit data $V_{dL}$ and $V_{UL}$ which are supplied from the D/A converters 1a-3 and 1b-3 are supplied to a window setting circuit 16. An analog value $V_\theta$ corresponding to the digital angle designation data $D_\theta$ is supplied to a comparator 22. The processing circuit 1-3 compares the angle designation data $D_\theta$ with first and second reference voltage data $V_1$ and $V_2$ and selects one of selection signals S3 to S5 and one of preset compensating voltage data $V_A$, $V_B$ and $V_C$ (the values of the voltage data $V_B$ and $V_C$ are negative) in accordance with a comparison result.

If the angle designation data $D_\theta$ is smaller than the first reference voltage data $V_1$, the processing circuit 1-3 generates the selection signal S3 and the compensation voltage data $V_A$. However, if $V_1 \leq D_\theta < V_2$ is established, the processing circuit 1-3 generates the selection signal S4 and the compensating voltage $V_B$. If $V_2 \leq D_\theta$ is established, the processing circuit 1-3 generates the selection signal S5 and the compensating voltage $V_C$. The selectively generated data are supplied to a multiplexer 20 and a D/A converter 1d-3, respectively.

The compensating voltage data $V_A$, $V_B$ and $V_C$ is supplied from D/A converter 1d-3 to the voltage shifting circuit 34. When the compensating voltage data $V_A$ from the D/A converter 1d-3 is supplied to the voltage shifting circuit 34, the multiplexer 20 supplies the first rotation angle detection signal $P_A$ to the voltage shifting circuit 34. Similarly, when the compensating voltage $V_B$ is supplied from the D/A converter 1d-3 to the voltage shifting circuit 34, the multiplexer 20 supplies the second rotation angle detection signal $P_B$ to the voltage shifting circuit 34. When the compensating voltage data $V_C$ is supplied to the voltage shifting circuit 34, the multiplexer 20 supplies the first angle detection signal $P_A$ to the voltage shift circuit 34. The voltage shifting circuit 34 adds the output from the multiplexer 20 and the output from the D/A converter 1d-3 in a controlling circuit 31-3. The output from the voltage shifting circuit 34 is supplied as the compensated angle detection signal P to the comparator 22.

The same effect as in the first and second embodiments can be obtained in the third embodiment so as to control the motor 10 irrespective of the unstable regions of the potentiometers 13 and 14.

In this case, the voltage shifting circuit 34 is inserted between the comparator 22 and the multiplexer 20. However, the voltage shifting circuit 34 may alternatively be inserted between the comparator 22 and the D/A converter 1c-3 to shift the angle designation signal $V_\theta$ so as to supply the compensated angle designation signal $V_{\theta S}$ to the comparator 22. Alternatively, the outputs from the multiplexer 20 and the D/A converter 1c-3 may be shifted by a half cycle, respectively.

In the first to third embodiments, the motor 10 is coarsely controlled in response to the output generated from the third potentiometer 5 and is then subjected to fine adjustment. Therefore, the controllable range of the rotation angle of the motor 10 can be widened, and the rotational range of the grating support 12 can be widened accordingly. In this case, the diodes 6 and 8 and the resistor 30 prefer the output from the lower or upper limit comparator 3 or 4 to the output from the comparator 22. Even if the processing circuit 1, 1-2 or 1-3 simultaneously generates the lower limit data $D_{dL}$, the upper limit data $D_{UL}$ and the angle designation data $D_\theta$, the motor 10 can be precisely controlled after a coarse adjustment. Unlike the case wherein the coarse adjustment and the fine adjustment are switched by the processing circuit 1, 1-2 or 1-3, the load of the processing circuit 1, 1-2 or 1-3 can be decreased, thereby simplifying the program.

Furthermore, in each of the first to third embodiments, the potentiometers 13 and 14 are switched in accordance with n/3 revolution and 3n/4 revolution states (where n is a positive integer or zero) which correspond to the reference voltages $V_1$ and $V_2$, respectively. However, the number of revolutions can change in accordance with the offset amount of each of the first and second potentiometers 13 and 14. In addition, the number of changing points is not limited to 2 but may be 1 or more than 3.

In the above description, the present invention is exemplified by the grating drive circuit. However, the circuit for controlling the rotation angle of the motor of the present invention can also be applied to positioning apparatuses of various types of machine tool and the drive circuits of various types of measuring equipment.

As described in detail, the circuit can control the rotation angle of the motor such that the phases of the first and second potentiometers are offset from each other to detect the rotation angle of the motor, and one of the outputs from these potentiometers is selected in accordance with the current angular position of the motor, thereby precisely controlling the motor irrespective of the unstable regions of the potentiometers. Therefore, one or more revolutions of the motor can be controlled, thus widening the controllable range. In addition, the third potentiometer is used to detect the rotational speed of the motor, so that the rotation of the motor from a given position to another angular position after several revolutions of the motor can be controlled. As a result, the controllable range of the rotation angle of the motor can be greatly widened.

What is claimed is:

1. A circuit for controlling the rotation angle of a motor by comparing an output signal from angle setting means with a detection result of potentiometer means for detecting the rotation angle of the motor while the motor is driven in response to the output signal from said angle setting means, comprising: a first potentiometer for detecting the rotation angle of the motor; a second potentiometer for detecting another rotation angle at a phase different from that of said first potentiometer; interval selecting means for selecting one of a plurality of interval signals in response to the output signal generated from said angle setting means; potentiometer selecting means for selecting one of the output signals from said first and second potentiometers in response to the output signal from said interval selecting means; compensating signal generating means for generating an offset compensating signal for compensating for an offset between a selected signal from said potentiometer selecting means and the output signal from said angle setting means; compensating means for compensating for one of the selected signal from said potentiometer selecting means and the output signal from said angle setting means in accordance with the offset compensating signal from said compensating signal generating means; and comparing means for comparing one compensated signal and another noncompensated signal by said compensating means and for controlling the motor in accordance with a comparison result.

2. A circuit according to claim 1, wherein said compensating signal generating means comprises a voltage generator, selects one of a plurality of compensating voltages generated from said voltage generator in accordance wiith the output signal generated from said interval selecting means, and generates a selected voltage as the offset compensating signal.

3. A circuit according to claim 1, wherein said compensating signal generating means comprises memory means for storing a plurality of offset compensating signals and reading means for reading out the offset compensating signal, causes the reading means to read out the offset compensating signal from said memory in response to the output signal from said interval selecting means, and generates the offset compensating signal.

4. A circuit according to claim 1, wherein said compensating means, said angle setting means and said compensating signal generating means are controlled by a single microprocessor for calculating the compensated angle signal obtained by compensating for the offset, the compensated angle signal being supplied as the output signal of said angle setting means to said comparing means.

5. A circuit according to claim 1, wherein said compensating means comprises voltage shifting means, shifts a voltage of one of the output signals from said potentiometer selecting means and the output signal from said angle setting means in accordance with the output signal from said compensating signal generating means, and compensates for the offset between the outputs from said potentiometer selecting means and said angle setting means.

6. A circuit according to claim 2, wherein said compensating means comprises voltage shifting means, which shifts a voltage of one of the output signal from said potentiometer selecting means and the output signals from said angle setting means in accordance with the output signal from said compensating signal generating means, and compensates for the offset between the outputs from said potentiometer selecting means and said angle setting means.

7. A circuit according to claim 3, wherein said compensating means comprises voltage shifting means, which shifts a voltage of one of the output signal from said potentiometer selecting means and the output signal from said angle setting means in accordance with the output signal from said compensating signal generating means, and compensates for the offset between the outputs from said potentiometer selecting means and said angle setting means.

* * * * *